United States Patent
Macquarrie et al.

(10) Patent No.: US 6,730,340 B1
(45) Date of Patent: May 4, 2004

(54) EDIBLE CASING FILM FORMULATION

(76) Inventors: Reg Macquarrie, 44 Belcourt Avenue, Barrie, Ontario (CA), L4M4E4; Kurt Schupp, 1071 Queens Avenue, Apt. 201, Oakville, Ontario (CA), L6H 2R5; Peter Taylor, 5 Idared Road, Carlisle, Ontario (CA), L0R 1H3

( * ) Notice: Subject to any disclaimer, the term of this patent is extended or adjusted under 35 U.S.C. 154(b) by 0 days.

(21) Appl. No.: 09/926,461

(22) PCT Filed: May 8, 2000

(86) PCT No.: PCT/CA00/00565

§ 371 (c)(1),
(2), (4) Date: Nov. 7, 2001

(87) PCT Pub. No.: WO00/67582

PCT Pub. Date: Nov. 16, 2000

(30) Foreign Application Priority Data

May 7, 1999 (CA) ............................................. 2271361

(51) Int. Cl.[7] ............................ C08L 5/00; A22C 13/00; B65D 37/00
(52) U.S. Cl. ...................... 426/105; 426/138; 426/578; 426/661
(58) Field of Search ................................ 426/103, 105, 426/138, 578, 661

(56) References Cited

U.S. PATENT DOCUMENTS 5,695,800 A * 12/1997 Merritt, II .................. 426/277
5,962,053 A * 10/1999 Merritt, II .................. 426/138
6,375,981 B1 * 4/2002 Gilleland et al. ........... 424/452
6,586,590 B1 * 7/2003 Renn et al. ................. 536/128

FOREIGN PATENT DOCUMENTS

| DE | 1213211 | 11/1962 |
|----|---------|---------|
| EP | 03/28317 | 8/1989 |
| EP | 04/00484 | 12/1990 |
| EP | 0709030 | 5/1996 |
| EP | 0795270 | 9/1997 |
| GB | 20/00424 | 6/1977 |
| JP | 60/55039 | 3/1985 |
| JP | 0489841 | 9/1992 |

OTHER PUBLICATIONS

International Search Report of Sep. 15, 2000 (4 pages).
International Preliminary Examination Report of Feb. 16, 2001 (4 pages).

* cited by examiner

*Primary Examiner*—N. Bhat
(74) *Attorney, Agent, or Firm*—Shlesinger, Arkwright & Garvey LLP

(57) ABSTRACT

Edible films incorporating carrageenan in conjunction with Konjac and/or Gellan gums have been prepared as substitutes for edible collagen film currently used in meat processing. Compositions according to the present invention overcome the inherent thermoreversibility of carrageenan gel and do not disintegrate from exposure to hot or boiling water. The film can readily be processed to form casing, bags or other packaging useful in the food industry.

8 Claims, No Drawings

EDIBLE CASING FILM FORMULATION

This application claims benefit under 35 U.S.C. 371 of PCT/CA00/00565 filed May 8, 2000.

BACKGROUND OF THE INVENTION

For a number of years, edible films have been used to replace membranes and casings made of animal viscera, in the production of smoked meat products such as ham and sausages. Currently available edible films include collagen films, modified cellulose films and carrageenan-based films.

Collagen films are composed of edible collagen, plasticized with glyerol or other polyols. They are manufactured by extrusion onto a belt followed by drying to remove the moisture. The collagen slurry is applied to the belt cold, and requires high-temperature drying to remove all the excess moisture and bring the film to a final moisture content of approximately 10%. Apart from the difficulty in processing films of this kind, these materials can bring about allergic reactions in certain consumers. Too, being derived from the coum layer of beef or pork, collagen may be an unacceptable casing or film material for religious and dietary reasons.

Modified cellulose films are for the most part composed of modified hydroxypropyl methylcellulose. To date, almost all films of this kind which have been produced are cold water-soluble films which begin to disintegrate on contact with water. For this reason, they have not been used in meat processing.

Carrageenan is a polyanionic polysaccharide derived from red algae. The material is an excellent film-former and has been used in the formulation of edible food packaging films (U.S. Pat. No. 4,851,394) and heat-sealable edible films (U.S. Pat. No. 5,089,307—Ninomiya et al.). Films composed primarily of carrageenan additionally exhibit excellent strength, are not soluble in cold water and bind well to meat However, because carrageenan forms a thermoreversible gel, films composed of a predominant carrageenan proportion tend to disintegrate in hot water, i.e. above 70° C. The hot carrageenan aqueous solution then re-gels upon contact with cooler water, less than 50° C.

It was one of our objectives to develop carrageenan-based films which can effectively and economically replace edible collagen films currently utilized in ham and sausage production, while providing high yields and high-quality product.

Collagen film is typically wrapped around hams during production, for ease in netting removal after the ham has been cooked. Collagen films appear to the consumer to be part of the ham after cooking and, indeed, are usually not taken note of by the average consumer. Many styles of meats are processed using collagen films, including various ham, chicken and turkey products.

General Description and Objects of the Invention

It is an object of the present invention to provide polysaccharide films which would function well by satisfying all of the following key attributes:

composed of food ingredients which meet Food Chemical Codex Specifications and are approved for usage, i.e. GRAS rated in the United States (generally regarded as safe).

a film that would maintain its composition during the cooking cycle, until the ham forms its own natural protein skin.

after cooking, film adheres to the finished product, in that it does not fully disintegrate after a prolonged exposure to hot water or steam.

film is tender to eat following processing of the meat product.

film binds to the meat surface during and subsequent to processing.

film is permeable to flavouring smoke.

film imparts an appealing shine and colour to the cooked product.

We have found that excellent properties for edible films can be achieved by including, along with the carrageenan, suitable non-thermoreversible gel-forming polymers, preferably Konjac and Gellan gums. Konjac is extracted from the konjac tuber. This polysaccharide hydrates immediately and can form either thermoreversible or non-thermoreversible gels, depending on the conditions under which the gel is formed. Gellan gum is a polysaccharide gum produced from bacterial fermentation. It is a strong gel former and produces gels that are non-thermoreversible in the presence of $Ca^{+2}$ and other multivalent anions. Both Konjac and Gellan gums are edible and GRAS rated. We observed that Konjac tends to form gels having a higher degree of elasticity than Gellan, which forms gels having a more brittle texture.

According to present invention, edible films and casing materials comprise a polymer base of carrageenan/Konjac/Gellan, and also a suitable starch, alginate or other polysaccharide, depending on the specific attributes required.

Starch functions to reduce water absorption of the film and it is preferred that a high-amylose starch be used, as high-amylose starch is inherently a better film-former than other starches.

"Alginate" herein refers to the alginates which are commonly used in the food industry, namely polypropylene glycol alginate, sodium alginate or calcium alginate. Alginate in compositions according to the present invention tend to produce strong films exhibiting good adhesion.

Specific methods and formulations are described in more detail below, but generally we have found the following compositions to provide useful edible films:

| Component | Suggested Range Low (wt. %) | Suggested Range High (wt. %) |
|---|---|---|
| Carrageenan | 2 | 35 |
| Gellan* | 0 | 35 |
| Konjac* | 0 | 35 |
| Locust bean gum (LBG) | 0 | 10 |
| Protein | 0 | 15 |
| Starch** | 0 | 20 |
| Alginate** | 0 | 35 |
| Sodium Citrate | 1 | 5 |
| Sorbitan Monostearate | 0.25 | 3 |
| Glycerol | 1.0 | 35 |
| Other Plasticizer† | 0 | 25 |
| Water | 8 | 35 |

**total of Gellan & Konjac gums should be no less than about 5 wt % and up to about 35 wt %
*total of starch + alginate should be no less than about 5 wt % and up to about 35 wt %
†polyhydric alcohols, other than glycerol The synergistic effects of the main polymers, Gellan Konjac and carrageenan, function to produce a film of high tensile strength, hot and cold water resistance and gum substrate adherence.

The use of a protein source is desirable to provide the film with both improved adhesion and shine functionality. The presence of some (at least about 5%) of alginatge or starch component is necessary to give sufficient film casing adhesion.

Other polysaccharides, as discussed below, may be added to impart specific desired properties to the film. Glyerol was added for its elasticizing effects. Optionally, calcium chloride or potassium carbonate may be utilized to improve the film strength and hot water resistance.

From other formulations tested it is possible to significantly alter the relative amounts of each gel-forming polymer in the film to produce films exhibiting some varying degree of hot water solubility.

DETAILED DESCRIPTION OF THE INVENTION

Polymer solutions were prepared for film casting as follows: glyerol or other plasticizers were added to the requisite amount of hot water. While maintaining the solution at an elevated temperature (80–90° C.), then the dry ingredients were added and the solution vigorously mixed to homogeneity. The polymer solution was then continuously mixed under slow agitation for 1–2 hours to remove trapped air bubbles.

Once the polymer solution appeared to be smooth and free of lumps, it was cast into film, using either a casting box or with a standard draw down bar. Care must be taken to ensure that the hot solution is cast in a uniform thin layer. In all of the experimental examples given below, film was formed by drawing the solution down onto a hot (90° C.) stainless steel belt with a Gardener dye. The films were either air dried overnight at room temperature, or dried over a hot water bath and then removed for testing.

Films produced this way would initially be tested for thickness using a micrometer (Gauge) and tensile/tear strength.

The methods for measuring tear strength and elongation are those specified in ASTMD638. Normally 5 specimens are tested from each of 5 samples with the following conditions 20 lbf load cell Crosshead speed: 2 in./minute Die "C" cut specimens Films that met these requirements would then be tested for hot water solubility by placing strips of the film in boiling water and then allowing the water to cool with the film sample in it. After cooling, the water would then be drained off and non-solubilized material would be placed with the drain dish in the drying overn. If the film was reconstituted after drying then the film was deemed to have maintained its structure during exposure to the hot water. If the film was not resistant to the water then it would become soluble and could be poured off. (Hence no film left after drying)

After a particular sample had been characterized as above, it would be subjected to the same process conditions under which commercial meats are produced. In particular the film would be wrapped around a particular meat substrate (turkey, ham, chicken) and then the wrapped meat sample dried in a convection oven until a protein skin could be seen forming on the sample. After this the sample was transferred into a steam cooker for the completion of cooking. The internal temperature of the meat sample would have to reach 70–80° C. After the completion of cooking, the sample was allowed to cool and the final product examined and results recorded. Samples were then packed away under vacuum for shelf-life testing.

Films according to the invention which we tested on meat film wrap were also produced using the following polysaccharides, supplementary to starch and/or alginate, with Gellan and/or Konjac: agar, modified starches, guar gum, cellulose gum, modified cellulose gum, gum arabic, pullian and xanthate.

In some of the formulations, the following proteins were included: gelatin, soya protein concentrate, soya protein isolate, whey protein concentrate, albumin, miscellaneous vegetable proteins, collagen and collagen hydrolysates.

The following general observations arose from our experiments:

(i) Either Gellan and/or Konjac is required for synergistic reaction with the carrageenan and other gums or polysaccharide to provide the desired hot water resistance. The proportion of Gellan and/or Konjac is that amount necessary to modify carrageenan sufficiently to ensure that the film will not disintegrate upon exposure to hot water. Films could be made out of Konjac or Gellan alone, but these would be far less economical than the combination with other polysaccharide and in any event would have inferior physical properties, e.g. poor film strength, susceptibility to hydration, etc.

(ii) The presence of starch or alginate is essential in these compositions to impart proper adhesion at the final film in its intended use as food film and casing.

(iii) Added protein is highly advantageous, to ensure proper adherence of the film to the meat after completion of cooking and for the aforementioned aesthetic purpose of mimicking the glossy appearance imparted by collagen.

The film compositions may also be modified by the addition of compounds for specific purposes, such as 1. anti-microbial;
2. release agents;
3. colourants (i.e. caramels, oleoresins and other synthetic or natural colourants—iron oxide);
4. flavors and spices.

With particular application to meat processing, black films can be produced using caramel, so that processors need no longer dip the meat products in a liquid caramel to obtain that colour.

EXAMPLES OF EDIBLE FILM FORMULATIONS

Example 1

| Component | Parts |
| --- | --- |
| Gellan | 15 |
| Locust bean gum | 3 |
| Kappa carrageenan | 3 |
| Konjac | 8 |
| Sodium citrate | 3 |
| Calcium chloride | 2 |
| Maltodextrin | 10 |
| Glycerol | 25 |
| Water | 30 |

This film exhibited very high tensile strength (140 kg/cm$^2$) and good elongation (30%). The film showed outstanding resistance to tear and had excellent handling properties. The film could be removed from a meat product after cooking very easily. (low adhesion)

Example 2

| Component | Parts |
|---|---|
| Gellan | 8 |
| Kappa carrageenan | 10 |
| Konjac | 3 |
| Locust bean gum | 2 |
| HVP | 7 |
| High amylose starch | 9 |
| Sodium citrate | 1 |
| Sorbitan monostearate | 1 |
| Glycerol | 25 |
| Polyethylene glycol | 5 |
| Water | 29 |

The film exhibited very high tensile strength (135–140 kg/cm$^2$) and elongation (35%), and in particular showed excellent wet tensile strength. Again this film showed outstanding mechanical handling properties and on a meat product had very good adhesion.

Example 3

| Component | Parts |
|---|---|
| Gellan | 4 |
| Kappa carrageenan | 7 |
| Konjac | 2 |
| Locust bean gum | 1 |
| HVP | 7 |
| High amylose starch | 14 |
| Glycerol | 32 |
| Caramel | 4 |
| Water | 29 |

This film exhibited good tensile strength (110 kg/cm$^2$) and elongation (35%) and because of the addition of caramel powder was black in colour. The film had good adhesion properties as well as excellent mechanical handling properties.

Example 4

| Component | Parts |
|---|---|
| Gellan | 10 |
| Locust bean gum | 5 |
| Kappa carrageenan | 8 |
| Hydrolyzed collagen | 10 |
| Maltodextrin | 7 |
| Propylene glycol alginate | 2 |
| Silicon dioxide | 6 |
| Sodium citrate | 2 |
| Potassium chloride | 2 |
| Glycerol | 30 |

This film exhibited moderate tensile strength (100 kg/cm$^2$) and good elongation (25%) and utilized collagen to give the film reasonable adhesion to a meat product.

Example 5

| Component | Parts |
|---|---|
| Carrageenan | 30 |
| Konjac | 15 |
| Alginate | 20 |
| Glycerol | 25 |
| Water | 10 |

This film was completely clear and exhibited a very high tensile strength (200 kg/cm$^2$) with and elongation of 40%. It showed very high adhesion and could not be removed from the meat product after cooking.

Finally, an unexpected advantageous property which we observed in films made according to the invention was efficient heat sealability at 180° C., suggesting usefulness of these films as a replacement for hydroxypropyl methyl cellulose films in casings and food pouches.

What is claimed is:

1. A liquid composition for casting into an edible film, comprising a uniform mixture of from 2 to 35 wt. % of carrageenan, from 5 to 35 wt. % of a gum selected from the group consisting of Gellan gum Konjac gum, from 5 to 35 wt. % of a polysaccharide selected from the group consisting of starches and alginates or combinations thereof, from 1 to 35 wt. % of glycerol, and from 8 to 35 wt. % of water.

2. A liquid composition according to claim 1, wherein said polysaccharide comprises a high-amylose starch.

3. A liquid composition according to claim 1, further comprising up to 10 wt. % of locust bean gum.

4. A liquid composition according to claim 1 and further comprising up to 15% of a protein selected from the group consisting of gelatin, soya protein concentrate, soya protein isolate, whey protein concentrate, albumin, vegetable protein, collagen and collagen hydrolysates.

5. A liquid composition according to claim 1 and further comprising up to 25 wt. % of a plasticizing polyhydric alcohol other than glycerol.

6. A liquid composition according to claim 1 and further comprising up to 5 wt. % of sodium citrate.

7. A liquid composition according to claim 1 and further comprising up to 2 wt. % of a salt selected from the group consisting of calcium chloride, potassium chloride and potassium carbonate.

8. An edible casing film prepared by forming and drying a film from a liquid composition according to claim 1 and wherein the proportion of Konjak gum an/or Gellan gum relative to the carrageenan present in said liquid composition has been selected such that the film produced does not disintegrate in water at a temperature in the range of from 70° to 100° C.

* * * * *